United States Patent
Blind et al.

(10) Patent No.: US 7,823,685 B2
(45) Date of Patent: Nov. 2, 2010

(54) OPERATING DEVICE FOR A VEHICLE

(75) Inventors: Alain Blind, Birkenau (DE); Gerd Schörry, Mannheim (DE)

(73) Assignee: Deere & Company, Moline, IL (US)

( * ) Notice: Subject to any disclaimer, the term of this patent is extended or adjusted under 35 U.S.C. 154(b) by 363 days.

(21) Appl. No.: 12/020,666

(22) Filed: Jan. 28, 2008

(65) Prior Publication Data

US 2008/0184841 A1  Aug. 7, 2008

(30) Foreign Application Priority Data

Feb. 2, 2007  (DE) .................. 10 2007 005 253

(51) Int. Cl.
  *B62D 1/12*  (2006.01)
  *G05G 9/047*  (2006.01)
(52) U.S. Cl. .................. 180/315; 74/471 XY
(58) Field of Classification Search .......... 180/315, 180/333, 332, 336, 324; 187/224, 233; 74/471 XY, 74/491
  See application file for complete search history.

(56) References Cited

U.S. PATENT DOCUMENTS

| | | | | |
|---|---|---|---|---|
| 2,366,883 | A | * | 1/1945 | Walter .................. 137/627.5 |
| 3,707,093 | A | * | 12/1972 | Worden .................. 74/471 XY |
| 4,533,827 | A | | 8/1985 | Fincher |
| 4,584,510 | A | | 4/1986 | Hollow |
| 4,748,441 | A | | 5/1988 | Brzezinski |
| 4,822,962 | A | | 4/1989 | Maccourt |
| 5,992,260 | A | * | 11/1999 | Fujiki et al. .................. 74/469 |
| H1822 | H | * | 12/1999 | Kelley et al. .................. 180/333 |
| H1831 | H | * | 2/2000 | Kelley et al. .................. 180/333 |
| 6,105,709 | A | * | 8/2000 | Eckstein et al. .................. 180/333 |
| D449,614 | S | * | 10/2001 | Osborn et al. .................. D14/412 |
| 6,404,187 | B1 | * | 6/2002 | Ruckert .................. 324/207.2 |
| 6,425,729 | B1 | * | 7/2002 | Coutant .................. 414/685 |
| 6,446,747 | B1 | * | 9/2002 | Muller et al. .................. 180/334 |
| 6,550,562 | B2 | * | 4/2003 | Brandt et al. .................. 180/333 |
| 6,854,554 | B2 | * | 2/2005 | Brandt et al. .................. 180/333 |

(Continued)

FOREIGN PATENT DOCUMENTS

DE  198 37 163  8/1998

(Continued)

OTHER PUBLICATIONS

German Search Report, dated Jan. 24, 2008, 4 Pages.

(Continued)

*Primary Examiner*—Paul N Dickson
*Assistant Examiner*—Joseph Rocca

(57) ABSTRACT

An operating device is provided for a vehicle, in particular for an agricultural or industrial utility vehicle. The operating device comprises a manually actuatable control lever. The control lever is used to adjust or modify the speed of the vehicle. The control lever is adjustable in a longitudinal direction, in order to adjust the speed of the vehicle. An implement with which at least one working function may be performed may be fitted to the vehicle. In order to enable ergonomic operation, it is proposed that the control lever comprise at least one operating element, with which the implement may be driven, and that the operating element be arranged so as to be movable together with the control lever in the longitudinal direction.

16 Claims, 3 Drawing Sheets

U.S. PATENT DOCUMENTS

| | | | | |
|---|---|---|---|---|
| 6,882,267 | B2* | 4/2005 | Nagasaka | 340/3.1 |
| 6,932,183 | B2* | 8/2005 | Jeppe et al. | 180/333 |
| 7,275,457 | B2* | 10/2007 | Easton | 74/473.12 |
| 7,275,616 | B2* | 10/2007 | Link et al. | 180/333 |
| 7,458,439 | B2* | 12/2008 | Catton et al. | 180/334 |
| 7,497,298 | B2* | 3/2009 | Shearer et al. | 180/333 |
| 2002/0070069 | A1* | 6/2002 | Brandt et al. | 180/333 |
| 2003/0037985 | A1* | 2/2003 | Jeppe et al. | 180/333 |
| 2005/0279561 | A1* | 12/2005 | Shearer et al. | 180/333 |
| 2006/0042857 | A1* | 3/2006 | Catton et al. | 180/334 |
| 2006/0201732 | A1 | 9/2006 | Dunn et al. | |
| 2007/0000223 | A1 | 1/2007 | Link et al. | |
| 2008/0257651 | A1* | 10/2008 | Williamson | 187/224 |
| 2009/0071742 | A1* | 3/2009 | Pline | 180/333 |
| 2009/0084214 | A1* | 4/2009 | Sakai et al. | 74/471 XY |
| 2009/0090208 | A1* | 4/2009 | Diccion | 74/471 XY |
| 2009/0139360 | A1* | 6/2009 | Diccion | 74/471 XY |
| 2010/0006377 | A1* | 1/2010 | McCabe | 187/224 |

FOREIGN PATENT DOCUMENTS

| | | |
|---|---|---|
| DE | 199 36 265 | 7/1999 |
| DE | 101 40 975 | 3/2003 |
| DE | 696 35 839 | 8/2006 |
| EP | 1 288 763 | 3/2003 |
| EP | 1 607 659 | 12/2005 |
| WO | WO 02/46855 | 6/2002 |

OTHER PUBLICATIONS

European Search Report, May 19, 2008, 6 Pages.

* cited by examiner

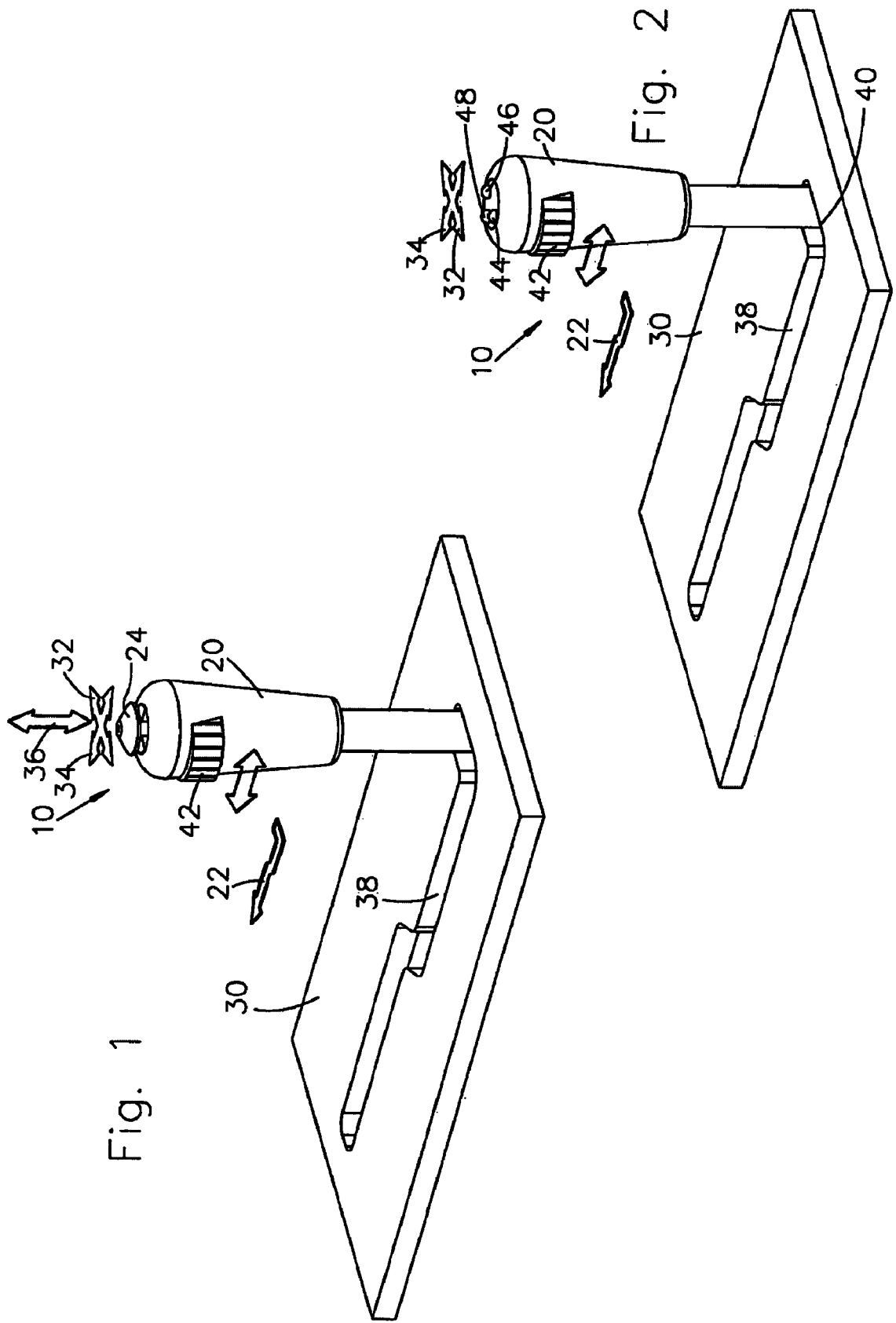

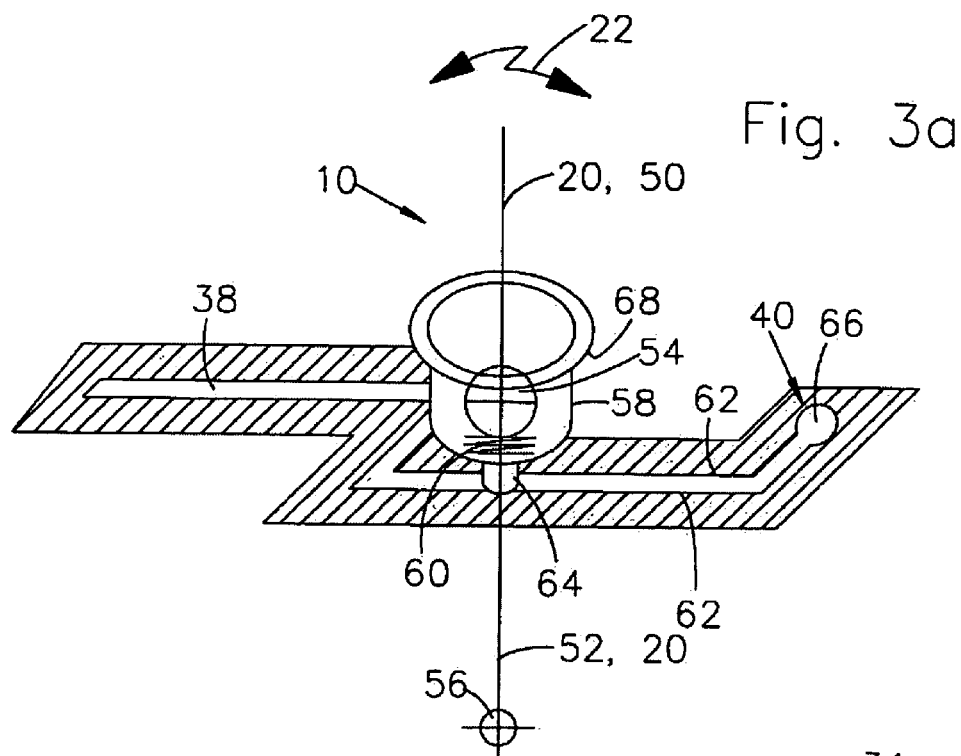
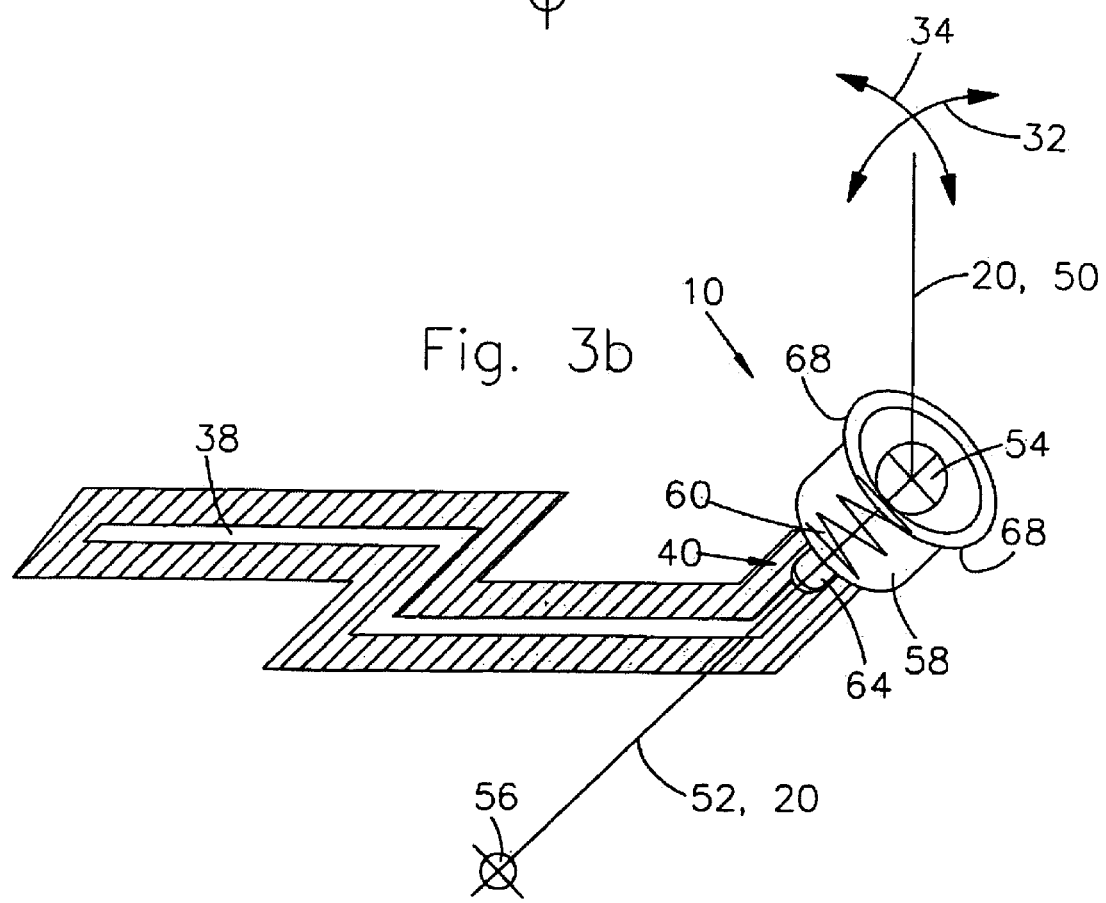

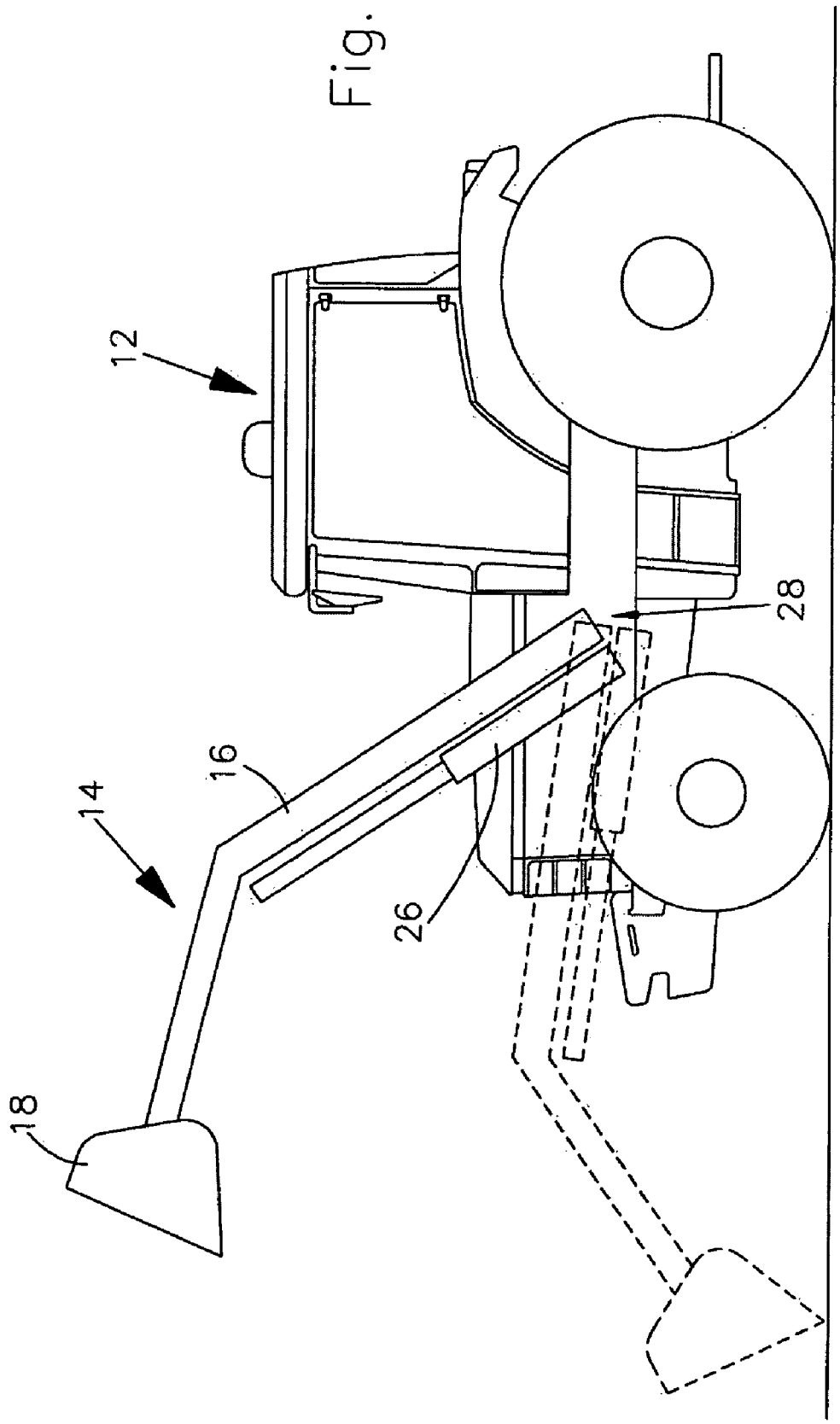

OPERATING DEVICE FOR A VEHICLE

FIELD OF THE INVENTION

The invention relates to an operating device for a vehicle, in particular for an agricultural or industrial utility vehicle. For instance, the vehicle could take the form of a construction machine, a telescopic loader, a tractor with front end loader or a tractor with an implement fitted thereto. The operating device comprises a manually actuatable control lever. The control lever is used to adjust or modify the speed of the vehicle. This could proceed, for example, through variation or adjustment of the engine speed and/or the gear ratio, a combination of adjustment of the engine speed and of the gear ratio being sensible particularly in the event of changes in the loads acting on the vehicle. The control lever is adjustable in a longitudinal direction, in order to adjust or modify the speed of the vehicle. To this end, at least one sensor can be provided on the control lever and/or on the console, which sensor detects the current position of the control lever and generates a (for example electrical) signal dependent thereon, which signal is fed to a control device of the vehicle. An implement with which at least one working function may be performed may be fitted to the vehicle. Such an implement could be a front end loader or a mower, for example. If the vehicle takes the form of a construction machine, the corresponding implement, for example a loader tool or a backhoe, is, as a rule, fitted firmly to the vehicle. A further example of such a vehicle is a vehicle with an earth auger or a delineator cleaning device together with vehicles with implements which have more than two functions and are particularly suitable for local authority use.

BACKGROUND OF THE INVENTION

An operating device with a manually actuatable control lever of the above-mentioned type is known for example from a tractor with an infinitely variable transmission (IVT-transmission) belonging to the applicant. Using the control lever, the vehicle speed or the transmission ratio of the infinitely variable transmission can be adjusted and/or modified. Such a control lever is known per se from DE 199 36 265 A1. The control lever therein is movable in the longitudinal direction and guided by a shift gate or a slot. The shift gate is of comparable construction to that shown in FIG. 2 and comprises a first and a second zone. In the first zone the vehicle speed can be adjusted between 0 km/h and a pre-determinable speed. The pre-determinable speed is adjustable with the rotary wheel of the control lever of the tractor of the current series. In the second zone the vehicle speed can be adjusted between the pre-determinable speed and a maximum, likewise pre-determinable speed. Thus, the operator can adjust the speed of the tractor by hand with the assistance of the control lever independently of any actuation of the accelerator pedal.

If such a tractor is equipped with a front end loader or a loading device, a joystick may be provided on the right-hand console for operating the front end loader, as known for example from DE 198 37 163 C1. This joystick solely controls actuators of the front end loader. Likewise, in various construction machines working functions such as, for example, that of a loading shovel, or that of a backhoe may be actuated by means of control levers with joystick functionality. With many working functions it is convenient to actuate them on the one hand independently of a moving vehicle and on the other hand as a function of the movement of the vehicle. If an operator actuates an implement while the vehicle is traveling, it is required, where for example a front end loader is fitted to the tractor, to control the steering wheel with one hand while actuating the joystick with the other hand to drive the front end loader and actuating the accelerator pedal with a foot to adjust the vehicle speed. This means actuating three different operating devices simultaneously, which can be tiring in the long run and/or requires a relatively long training phase until the operator can operate the vehicle optimally with the implement fitted.

SUMMARY OF THE INVENTION

The object of the present invention is therefore to provide and further develop an operating device of the above-mentioned type so as to overcome the above-stated problems. In particular, the operating device according to the invention needs to enable ergonomic operation, so as to improve operation of the vehicle and of the implement.

According to the invention, the operating device of the above-mentioned type is characterized in that the control lever comprises at least one operating element with which the implement may be driven, and in that the operating element is arranged so as to be movable together with the control lever in the longitudinal direction.

According to the invention, it was firstly recognized that simultaneous operation of the vehicle and of the implement is possible just with two hands, i.e. without foot actuation, if at least one operating element for driving the implement is also provided on the control lever with which the vehicle speed is adjusted. It is not then necessary for the operator to swap between two operating devices, namely the joystick for driving the front end loader and the control lever for adjusting the vehicle speed, in order to achieve more or less simultaneous operation of vehicle and implement. By providing the at least one operating element for driving the implement on the control lever, it is possible in advantageous manner on the one hand to adjust or modify the vehicle speed and on the other hand to drive the implement. Thus, the operator may control the steering wheel with one hand while actuating the control lever with the other hand on the one hand to act on the vehicle speed and on the other hand to drive the implement, this being possible at the same time and without swapping to another control lever. It is no longer necessary for the operator to actuate the accelerator pedal with a foot in order to modify the vehicle speed. Instead, the operator can have one foot positioned ready to react on the brake pedal, such that the operator can react more quickly if need be, which is safer. In this way, simple and—after a short training phase—also intuitive operation of the vehicle and of the implement is possible. This operating concept is additionally ergonomic and an operator can operate the vehicle over a relatively long period with the operating device according to the invention without becoming tired as a result.

The implement provided or fittable on the vehicle comprises at least one hydraulic, pneumatic, and/or electrical actuator. Such an actuator is actuatable with the at least one operating element. Thus, for example, a front end loader comprises two hydraulic actuators in the form of hydraulic cylinders, with which the boom of the front end loader can be raised or lowered. Moreover, a hydraulic actuator likewise in the form of a hydraulic cylinder is provided for tipping the loader tool. A further example of an implement could be a mower, which may be fitted to a front or rear three-point implement linkage of the vehicle. Raising or lowering the mower is effected in this case likewise with two actuators taking the form of hydraulic cylinders, but which here are components of the respective three-point implement linkage (lifting cylinders of the three-point implement linkage). In this respect it is also feasible in this context for one actuator to move the implement, but not to have absolutely to be assigned thereto.

As already indicated, the implement may be coupled to a rear three-point implement linkage, to a front three-point implement linkage of the vehicle and/or to an implement interface provided on the vehicle. This instance is particularly applicable to a tractor taking the form of an agricultural utility vehicle, a large number of implements namely being capable of being fitted to a three-point implement linkage thereon. These implements may include a plough, a harrow, a sprayer, a round baler and/or a seed drill. Agricultural or forestry machinery or implements for local authority use or special attachments are also relevant here. These implements may be driven in completely different ways. For example, raising and lowering of the respective implement could be initiated by means of the operating element provided on the control lever even during slow forward or reverse travel. At the same time, it could be necessary, in the case of forwards travel of the vehicle, to adapt the horizontal and/or vertical position and the inclination of a mower to ground conditions, such adjustment likewise being possible with at least one operating element provided on the control lever.

According to one embodiment, the implement comprises a loading device and in particular a front end loader. At least one operating element is arranged on the control lever for driving the loading device. Such a vehicle could, for example, be a loader vehicle in which the loading device or the front end loader is permanently fitted or arranged on the loader vehicle. However, it could also be vehicle taking the form of a tractor, to which a front end loader or a loading device may be fitted. Conventionally, such a front end loader is attached to the tractor for a relatively long period. With precisely this kind of application, a combination of varying the vehicle speed and driving the loading device may be expedient. Thus, for example, a loading device with a loading shovel could be used for loading sand onto a truck. As soon as sand has been picked up with the shovel, the vehicle will travel towards the truck. The boom or the shovel of the loading device may already be raised during this journey, in order to bring the shovel full of sand as quickly as possible into a discharge position at the truck. A comparable example involves a loader tool in the form of a bale grip and transportation of a round bale.

The control lever is arranged to be adjustable in a longitudinal direction, any adjusting movements being feasible in principle. It is preferable for the control lever to be guided or mounted in such a way that adjustment of the control lever in a longitudinal direction proceeds in accordance with rotary motion about an axis of rotation. As an alternative, adjustment of the control lever could proceed by swiveling or shifting. If the control lever can be adjusted by shifting, this could substantially take place in the manner of a translational movement. Accordingly, the longitudinal axis of the control lever always has substantially the same orientation in different adjustment positions. A combination of the preferred adjustment modes is also feasible.

According to one embodiment, the operating element takes the form of a joystick. The joystick is arranged so as to be movable together with the control lever in the longitudinal direction. Accordingly, the operating element could comprise a universal or ball-and-socket joint mounting arrangement, with which the operating element may be deflected. The operating element is here provided directly on the control lever and is therefore moved together with the control lever on adjustment of the control lever in a longitudinal direction.

The joystick could be deflectable in two mutually independently oriented directions. Preferably, the two mutually independently oriented directions are arranged perpendicularly to one another, wherein, however, deflection of the joystick in any desired direction is also possible if this can result from the two independent directions.

The one deflection direction could be oriented substantially parallel to the longitudinal control lever adjustment direction. The other deflection direction could be oriented substantially perpendicularly thereto. Thus, the direction of deflection of the joystick is coupled with the possibility of adjusting the control lever in its longitudinal direction. This encourages intuitive operation of the operating device.

The joystick could be arranged on an area of the control lever remote from the control lever console. In other words, the joystick could be arranged at an upper area of the control lever and actuated, for example, by the operators thumb, while the other fingers of the operator's hand grip round the control lever. Thus, the control lever could be shifted by the operator's hand to adjust the vehicle speed while at the same time the joystick could be operated by the thumb to drive a front end loader.

Moreover, the control lever could have a longitudinal axis. The joystick could be movable in the direction of the longitudinal axis of the control lever. This could be associated with a drive functionality and/or a safeguarding functionality upon driving of the implement. Thus, for example, it could be provided that the implement is drivable only when the joystick is pressed downwards in the direction of the longitudinal axis of the control lever and is accordingly driven in accordance with the desired drive functionality by deflection of the joystick. In this way inadvertent actuation of the joystick could be at least largely avoided.

Alternatively or in addition, in a preferred embodiment the control lever could have at least one catch position along its adjustment path in the longitudinal direction, into which catch position the control lever may be moved and in which the control lever is deflectable in two mutually independently oriented directions. In this catch position the control lever could have a functionality comparable to that of a joystick. In other words, in this embodiment the control lever can only be adjusted in a longitudinal direction to adjust the vehicle speed. If it is then desired to drive the implement, the control lever may be moved into the catch position for this purpose. Only in this catch position can the control lever also be deflected in directions other than the longitudinal direction.

Out of practical considerations, provision could be made for the control lever to comprise an operating element for adjusting the travel speed of the vehicle and/or for adjusting offset of the travel speed of the vehicle. This operating element could take the form of a rotary wheel or of a slider and/or of a potentiometer. If, for example, the control lever has been brought into the catch position and thus it is only possible to drive the implement by the provided joystick functionality, the traveling speed of the vehicle can nonetheless be modified by means of the operating element, arranged on the control lever, for adjusting the traveling speed and/or the offset thereof, and this without adjusting the control lever in the longitudinal direction. Thus, it is also possible in this embodiment to act on the vehicle speed and drive the implement at the same time with one operating hand and without swapping to another operating element.

For safety reasons, provision could be made for the operating element for adjusting travel speed and/or for adjusting a travel speed offset to be activated only when the control lever is in an operating state in which the implement is operated. If the control lever is in another operating state, the operating element for adjusting the travel speed and/or the offset thereof could be deactivated. In such an operating state this operating element could, for example, be provided with another function.

According to one embodiment, the control lever comprises an operating element for activating and deactivating drive of the implement. Such an operating element could likewise be provided for safety purposes, such that the implement is not inadvertently actuated when all that is intended is actuation of the control lever to adjust the vehicle speed. In practice, such an operating element could also be constructed in such a way that actuation of the operating element is necessary in order to bring the control lever into the catch position or move it out of the catch position.

Moreover, the control lever could comprise at least one momentary-contact switch and/or rocker switch, with which a hydraulic function of the implement is actuatable. As already mentioned, the lifting cylinders of a three-point implement linkage of the vehicle or of a boom of a front end loader could be actuated with such a rocker switch. In this context, provision could also be made for a working function to be assigned in modifiable manner to at least one operating element provided on the control lever. Such assignment could be set by an operator, if a corresponding input and selection option is provided. Such assignment could alternatively or additionally proceed automatically after coupling-on of a given implement, if the implement is able to communicate with the vehicle via a corresponding electronic interface. An example thereof is the ISO bus according to ISO standard 11783.

In a specific embodiment, for driving a loading device the control lever comprises three rocker switches, one momentary-contact switch and one rotary wheel with potentiometer function. With the three rocker switches—in particular with changeover or diverter functionality—hydraulic functions of the front end loader are actuated, for example raising or lowering of the boom and upward or downward tipping of the loader tool. An additional function of the loader tool could also be actuated with such a switch, for example opening or closing of a loader grip. The momentary-contact switch serves to lock or unlock the control lever in the catch position. The rotary wheel serves in adjusting travel speed. An operating device of such a construction is merely one exemplary embodiment of an operating device according to the invention constructed specifically for this particular instance of application, which operating device is designed for operation of the vehicle with the loading device. Accordingly, similar or different operating devices may be constructed for other instances of application.

BRIEF DESCRIPTION OF THE DRAWINGS

FIG. 1 is a perspective view of a first exemplary embodiment of an operating device according to the invention;

FIG. 2 is a perspective view of a second exemplary embodiment of an operating device according to the invention;

FIG. 3*a* shows a third exemplary embodiment of an operating device according to the invention;

FIG. 3*b* shows the exemplary embodiment of FIG. 3*a*; in which the control lever is arranged in another position; and, FIG. 4 shows a vehicle in the form of a tractor, to which an implement in the form of a loading device is attached.

DESCRIPTION OF THE PREFERRED EMBODIMENT

FIG. 1 shows a first exemplary embodiment of an operating device 10 according to the invention for a vehicle 12 (FIG. 4).

The vehicle 12 shown in FIG. 4 is a tractor 12 with an implement in the form of a loading device 14. The loading device 14 comprises a boom 16, which is coupled rotatably with its one end to the tractor 12 and which comprises at its other end a loader tool 18 in the form of a shovel. The loading device 14 comprises two hydraulic actuators 26 (on the left- and right-hand sides of the tractor 12, just one actuator being shown in FIG. 4), which take the form of hydraulic cylinders and with which the boom 16 may be rotated relative to the tractor 12. The loading device 14 is attached to an implement interface 28 provided on the tractor 12, which interface 28 is known per se from the prior art.

The operating device 10 comprises a manually actuatable control lever 20. The speed of the vehicle can be adjusted using the control lever 20. To this end, the control lever 20 is adjustable in a longitudinal direction, which is indicated with the arrow 22. During such an adjusting movement, the control lever 20 is guided in a guide slot 38 or a shift gate.

In accordance with the invention, the control lever according to FIG. 1 comprises at least one operating element or joystick 24, with which the loading device 14 may be driven. The operating element 24 is arranged at an upper part of the control lever 20 and moves together with the control lever 20 on movement of the control lever 20 in the longitudinal direction according to arrow 22. Thus, the joystick 24 is arranged in an area of the control lever 20 remote from a console 30 of the control lever 20.

The control lever according to FIGS. 1 and 2 is guided or mounted in the console 30 in such a way that adjustment of the control lever 20 in a longitudinal direction (arrow 22) takes place by shifting the control lever 20 in the manner of a translational movement.

The operating element 24 according to FIG. 1 takes the form of a joystick. The joystick 24 is moved together with the control lever 20 on adjustment thereof in the longitudinal direction. The joystick 24 may be deflected in two mutually independently oriented directions. The directions are labeled with arrows 32, 34. The one deflection direction 34 is substantially parallel to the longitudinal direction labeled with the arrow 22. The other deflection direction 32 is oriented substantially perpendicular thereto.

The control lever 20 has a longitudinal axis 36. The joystick 24 is movable in the direction of the longitudinal axis 36 of the control lever 20. This is associated with a diverter function for the drive functionality of the loading device 14. Starting from the operating state shown in FIG. 1 of the joystick 24, the joystick 24 may be moved downwards along the longitudinal axis 36 of the control lever 20, into a position, not shown in FIG. 1, in which it is nonetheless deflectable in the directions 32, 34. In such an operating state the joystick 24 is activated to drive the loading device. Thus, the joystick 24 is arranged so as to be movable in the direction 36 or its functionality as operating element serves in activating and deactivating driving of the loading device. If the joystick 24 is moved in the direction 34, the boom 16 of the loading device 14 is raised or lowered thereby. If the joystick 24 is moved in the direction 32, the shovel 18 of the loading device 14 is tipped upwards or downwards. Actuation of the joystick 24 and adjustment of the control lever 20 in the longitudinal direction (arrow 22) is possible (even simultaneously).

The exemplary embodiment according to FIG. 2 shows a control lever 20, which is likewise mounted or guided so as to be displaceable in a longitudinal direction (labeled with arrow 22) in a guide slot 38 in a console 30 for adjustment of vehicle speed. The guide slot 38 of FIG. 2 comprises a catch position at one end 40, into which the control lever 20 can be moved. Control lever 20 is shown in this catch position in FIG. 2. In this catch position the control lever 20 can be deflected in two mutually independently oriented directions, wherein the deflection directions are indicated with the arrows 32, 34. In this respect, the control lever 20, when located in the catch position, has a functionality which is comparable with the functionality of a joystick.

The control levers 20 shown in FIGS. 1 and 2 in each case comprise an operating element 42 for adjusting the travel speed of the tractor 12. The operating element 42 may also be used to adjust an offset of the travel speed of the tractor 12. The operating element 42 takes the form of a rotary wheel and has the functionality of a potentiometer.

The control lever 20 according to FIG. 2 comprises three momentary-contact switches 44, 46 and 48, with which a hydraulic function of an implement (not shown) suitable for fitting to the rear three-point implement linkage (not shown) of the tractor 12 may be actuated. Although not explicitly shown in FIGS. 1 and 2, the handle part of the control lever 20 could itself take a shape which corresponds to the shape of a handle part of a conventional joystick.

FIGS. 3a and 3b show a further exemplary embodiment of an operating device 10 according to the invention, which has a method of operation comparable to the operating device 10 according to FIG. 2. Here, the control lever 20 has an upper area 50 and a lower area 52. The upper area 50 is gripped by the operator's hand and thus actuated. The lower area 52 is connected by its upper end to the ball-and-socket joint 54. The other end of the lower area 52 is attached to the vehicle by the ball-and-socket joint 56 in such a way that the lower area 52 can move in two mutually independently oriented directions about a pivot or swivel point. The lower area 52 of the control lever 20 is guided in the shift gate or the guide slot 38 such that the lower area 52 (together with the upper area 50) of the control lever 20 can be moved in the longitudinal direction 22.

The control lever 20 comprises a locking element 58, which, in the situation shown in FIG. 3a, encloses the ball-and-socket joint 54 (substantially cylindrically). The ball-and-socket joint 54 and the locking element 58 act together in this position in such a way that the upper area 50 and the lower area 52 of the control lever 20 cannot move relative to one another. In other words the locking element 58 locks together the two areas 50, 52 of the control lever 20. Between the ball-and-socket joint 54 and the inner, lower area of the locking element 58 there is provided a spring 60, with which the locking element 58 is urged in the direction of the longitudinal axis of the lower area 52 and away from the ball-and-socket joint 54. As long as the control lever 20 or the lower area 52 is guided in the guide slot 38, which comprises only the mutually parallel sides 62, the locking element 58 is located in a position relative to the ball-and-socket joint 54 in which the two areas 50, 52 of the control lever 20 are connected rigidly together. FIG. 3b shows the control lever 20 in a position in which the lower area 52 is located in the catch position 40 of the guide slot 38. The outer, lower area 64 of the locking element 58 is of substantially cylindrical construction and has an external diameter which is larger than the width of the guide slot 38 or of the spacing of the opposing sides 62. At the catch position 40 the guide slot 38 comprises a circular widened portion or recess 66, in which the lower, outer area 64 of the locking element 58 may at least partially engage or fit, such that the spring 60 may in part relax. In this way, at least the lower area 52 of the control lever 20 is locked in the catch position 40, such that the lower area 52 cannot be moved without additional unlocking into the part of the guide slot 38 which comprises the two mutually parallel sides 62. In the catch position 40, the locking element 58 can be moved away from the ball-and-socket joint 54 and the two areas 50, 52 of the control lever 20 can move relative to one another via the ball-and-socket joint 54. In the catch position 40, the upper area 50 of the control lever 20 can thus be operated like a joystick, i.e. it can be deflected at least in the directions 32 and 34.

The control lever can be moved back out of the catch position 40 by moving the locking element 58 upwards. To this end, the handle part 68 is provided, which may be actuated with two fingers, for example. If this is the case, the hollow cylindrical inner area of the locking element 58 once again engages around the ball-and-socket joint 54, whereby the two areas 50, 52 of the control lever 20 are again arranged rigidly relative to one another.

Having described the preferred embodiment, it will become apparent that various modifications can be made without departing from the scope of the invention as defined in the accompanying claims.

The invention claimed is:

1. An operating device for a vehicle, the operating device comprising a manually actuatable control lever, the speed of the vehicle being adjustable using the control lever, the control lever being adjustably guided in a longitudinal direction within a guide slot in order to adjust the speed of the vehicle, and it being possible to fit an implement on the vehicle, wherein the control lever comprises at least one operating element with which the implement may be driven and wherein the operating element is arranged so as to be movable together with the control lever in the longitudinal direction and wherein the guide slot comprises at least one catch position, into which the control lever may be moved, wherein the control lever may be deflected in two mutually independently oriented directions only in the at least one catch position, wherein the catch position comprises an enlarged area located at a longitudinal end of the guide slot allowing the controller to function as a joystick.

2. An operating device according to claim 1, wherein the implement comprises at least one of a hydraulic, pneumatic and/or electrical actuator, which is actuatable using the at least one operating element.

3. An operating device according to claim 1, wherein the implement may be coupled to at least one of a rear three-point implement linkage, a front three-point implement linkage and/or to an implement interface provided on the vehicle.

4. An operating device according to claim 1, wherein the implement comprises a loading device, and the at least one operating element is arranged on the control lever for driving the loading device.

5. An operating device according to claim 1, wherein the control lever is guided in such a way that adjustment of the control lever in a longitudinal direction proceeds in accordance with a rotary motion about an axis of rotation or swiveling or shifting of the control lever.

6. An operating device according to claim 1, wherein the operating element takes the form of a joystick and the joystick is arranged so as to be movable together with the control lever in the longitudinal direction.

7. An operating device according to claim 6, wherein the joystick is deflectable in two mutually independently oriented directions.

8. An operating device according to claim 7, wherein the one deflection direction is oriented substantially parallel to the longitudinal direction and the other deflection direction is oriented substantially perpendicularly thereto.

9. An operating device according to claim 6, wherein the joystick is arranged on an area of the control lever remote from the console of the control lever.

10. An operating device according to claim 6, wherein the control lever has a longitudinal axis and the joystick is movable in the direction of the longitudinal axis of the control lever and a drive functionality of the implement is associated therewith.

11. An operating device according to claim 1, wherein the control lever comprises an operating element for adjusting the travel speed of the vehicle and/or for adjusting an offset of the travel speed of the vehicle, which operating element takes the form of one of a rotary wheel, a slider, and a potentiometer.

12. An operating device according to claim 11, wherein the operating element for adjusting travel speed and/or for adjusting a travel speed offset is activated only when the control lever is in an operating state in which the implement is operated.

13. An operating device according to claim 1, wherein the control lever comprises an operating element for activating and deactivating drive of the implement.

14. An operating device according to claim 1, wherein the control lever comprises at least one of a momentary-contact switch and rocker switch, with which a hydraulic function of the implement is actuatable.

15. An operating device according to claim 1, wherein for driving a loading device, the control lever comprises three rocker switches, one momentary-contact switch and one rotary wheel with potentiometer function.

16. An operating device according to claim 1, wherein a working function may be assigned in modifiable manner to at least one operating element provided on the control lever.

\* \* \* \* \*